US012449758B2

(12) United States Patent
Iwama et al.

(10) Patent No.: US 12,449,758 B2
(45) Date of Patent: Oct. 21, 2025

(54) FIXING DEVICE, IMAGE FORMING APPARATUS, AND INSPECTION METHOD

(71) Applicants: Mototaka Iwama, Kanagawa (JP); Arinobu Yoshiura, Kanagawa (JP); Shogo Nakamoto, Kanagawa (JP); Takamasa Hase, Kanagawa (JP); Kentaro Yamashita, Kanagawa (JP); Daisuke Inoue, Tokyo (JP)

(72) Inventors: Mototaka Iwama, Kanagawa (JP); Arinobu Yoshiura, Kanagawa (JP); Shogo Nakamoto, Kanagawa (JP); Takamasa Hase, Kanagawa (JP); Kentaro Yamashita, Kanagawa (JP); Daisuke Inoue, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/603,262

(22) Filed: Mar. 13, 2024

(65) Prior Publication Data

US 2024/0310770 A1 Sep. 19, 2024

(30) Foreign Application Priority Data

Mar. 17, 2023 (JP) ................................ 2023-043146
Dec. 12, 2023 (JP) ................................ 2023-209366

(51) Int. Cl.
*G03G 15/20* (2006.01)
*G03G 15/00* (2006.01)
*G03G 21/16* (2006.01)

(52) U.S. Cl.
CPC ..... *G03G 21/1685* (2013.01); *G03G 15/2017* (2013.01); *G03G 15/2053* (2013.01);
(Continued)

(58) Field of Classification Search
CPC ............... G03G 15/55; G03G 15/2017; G03G 15/2053; G03G 21/1647;
(Continued)

(56) References Cited

U.S. PATENT DOCUMENTS

2002/0015148 A1* 2/2002 Tomomatsu ....... G01N 21/8806 356/237.2
2005/0276907 A1* 12/2005 Harris .................. G01N 21/951 427/8

(Continued)

FOREIGN PATENT DOCUMENTS

CN 106256118 A * 12/2016 ............. B41J 29/13
JP 2005022218 A * 1/2005

(Continued)

*Primary Examiner* — Robert B Beatty
(74) *Attorney, Agent, or Firm* — XSENSUS LLP

(57) ABSTRACT

A fixing device includes a fixing rotator to fix an unfixed image on a recording medium, a pressure member disposed opposite the fixing rotator to press an outer circumferential surface of the fixing rotator; a heating source disposed inside an inner circumferential surface of the fixing rotator to heat the fixing rotator, and a composite member disposed inside the inner circumferential surface. The composite member includes a first member, a second member attached to the first member, and an inspection region for measurement of glossiness. The first member and the second member have a difference in glossiness. The inspection region allows identification of which one of the first member and the second member is present on a surface of the inspection region based on the glossiness of the inspection region, and determination of that the fixing device has a desired fixing configuration based on a result of the identification.

7 Claims, 9 Drawing Sheets

(52) U.S. Cl.
CPC ......... *G03G 15/2064* (2013.01); *G03G 15/55* (2013.01); *G03G 2215/2035* (2013.01); *G03G 2221/1639* (2013.01)

(58) Field of Classification Search
CPC ... G03G 2215/2035; G03G 2221/1639; G03G 21/1685; G01N 21/57
USPC ............................................ 399/12, 33, 329
See application file for complete search history.

(56) References Cited

U.S. PATENT DOCUMENTS

| | | | | |
|---|---|---|---|---|
| 2018/0361750 | A1* | 12/2018 | Broen | B41J 2/1752 |
| 2020/0159151 | A1* | 5/2020 | Utsunomiya | G03G 15/2053 |
| 2021/0173331 | A1 | 6/2021 | Honda | |
| 2023/0063831 | A1* | 3/2023 | Sugiyama | G03G 15/2064 |

FOREIGN PATENT DOCUMENTS

| | | | |
|---|---|---|---|
| JP | 2017-009881 | A | 1/2017 |
| JP | 2021-092639 | A | 6/2021 |

* cited by examiner

FIXING DEVICE, IMAGE FORMING APPARATUS, AND INSPECTION METHOD

CROSS-REFERENCE TO RELATED APPLICATIONS

This patent application is based on and claims priority pursuant to 35 U.S.C. § 119(a) to Japanese Patent Application Nos. 2023-043146, filed on Mar. 17, 2023, and 2023-209366, filed on Dec. 12, 2023, in the Japan Patent Office, the entire disclosure of each of which is hereby incorporated by reference herein.

BACKGROUND

Technical Field

Embodiments of the present disclosure relate to a fixing device, an image forming apparatus, and an inspection method.

Related Art

In an electrophotographic image forming apparatus, it is known to use a fixing device having a fixing belt and a pressure member facing the fixing belt. In such a fixing device, a nip portion (fixing nip) is formed by the fixing belt and the pressure member, and a recording medium is let passed through the nip portion to perform fixing.

For example, there is known a fixing device including a rotating body (fixing belt), a nip former, a heating element, and a reflecting member. The reflecting member reflects radiant heat radiated from the heating element on the reflecting surface. In addition, the fixing device includes a reflecting member attachment unit, and even if the nip former is bent, the action of efficiently heating the fixing belt can be maintained by the reflection shape of the reflecting member.

However, in the case of inspecting a component such as a thin and highly smooth reflecting member used in a fixing device, it may be necessary to perform dedicated processing on the component or use an expensive inspection device, which is a disadvantage of cost increase.

SUMMARY

According to an embodiment of the present disclosure, a fixing device includes a fixing rotator, a pressure member, a heating source, and composite member. The fixing rotator fixes an unfixed image on a recording medium. The pressure member is disposed opposite the fixing rotator to press an outer circumferential surface of the fixing rotator. The heating source is disposed inside an inner circumferential surface of the fixing rotator to heat the fixing rotator. The composite member is disposed inside the inner circumferential surface of the fixing rotator. The composite member includes a first member, a second member, and an inspection region. The second member is attached to the first member. The first member and the second member have a difference in glossiness. The inspection region is for measurement of glossiness. The inspection region allows identification of which one of the first member and the second member is present on a surface of the inspection region based on the glossiness of the inspection region, and determination of that the fixing device has a desired fixing configuration based on a result of the identification.

According to another embodiment of the present disclosure, an image forming apparatus comprising the fixing device.

According to still another embodiment of the present disclosure, an inspection method is provided for a fixing device including: a fixing rotator to fix an unfixed image on a recording medium; and a composite member disposed inside an inner circumferential surface of the fixing rotator, the composite member including a first member and a second member attached to the first member, the first member and the second member having a difference in glossiness. The inspection method includes identifying and determining. The identifying identifies which one of the first member and the second member is present on a surface of an inspection region that is a region for measurement of glossiness in the composite member, based on the glossiness of the inspection region. The determining determines that the fixing device has a desired fixing configuration based on an identification result.

According to still yet another embodiment of the present disclosure, an inspection method is provided for a composite member included in a fixing device. The composite member including a first member and a second member attached to the first member, the first member and the second member having a difference in glossiness. The inspection method includes identifying and determining. The identifying identifies which one of the first member and the second member is present on a surface of an inspection region that is a region for measurement of glossiness in the composite member, based on the glossiness of the inspection region. The determining determines that the composite member has a desired configuration based on an identification result.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
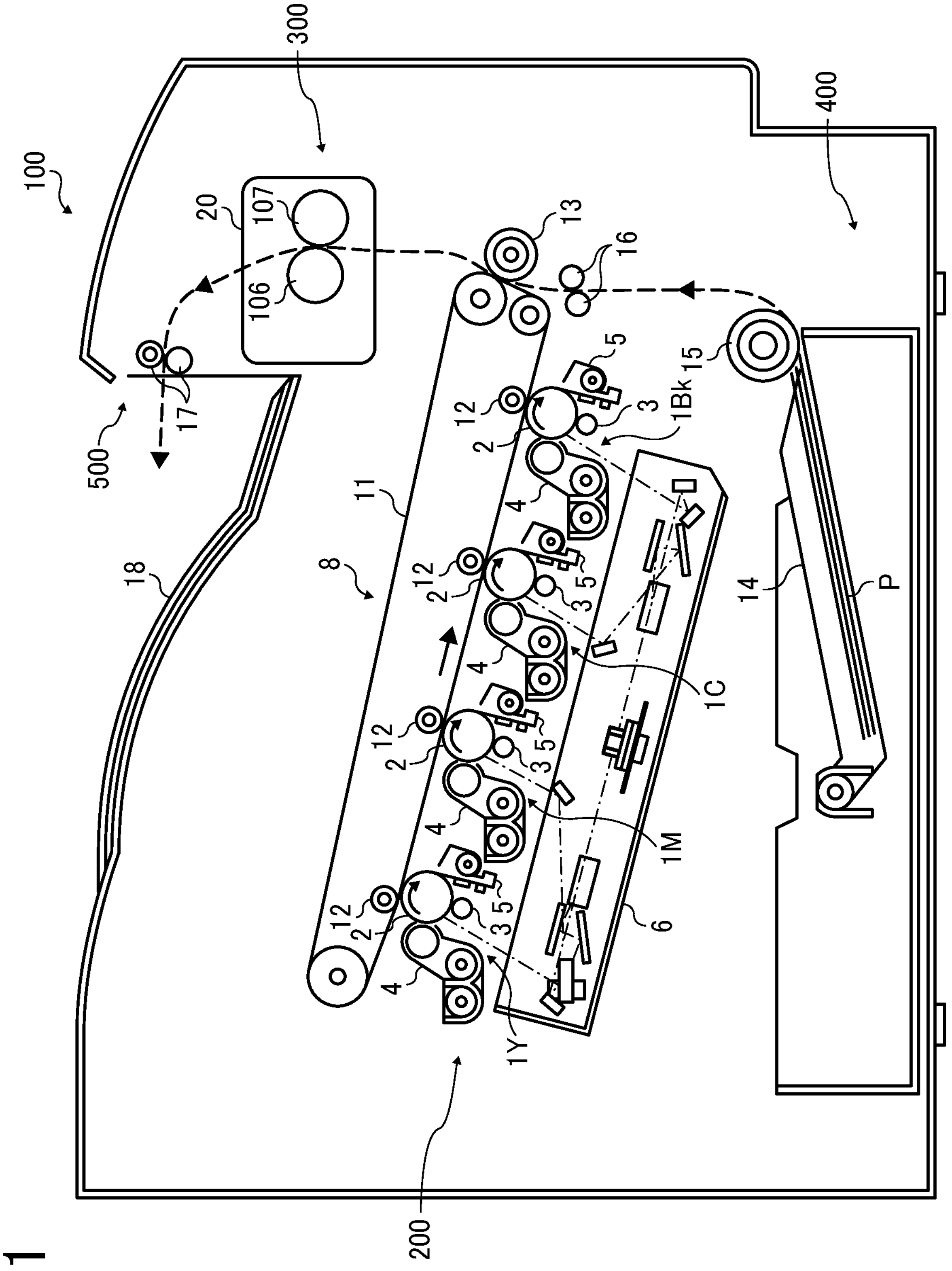
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a fixing device, an image forming apparatus, and an inspection method according to embodiments of the present disclosure will be described by referring to the drawings. Note that the present invention is not limited to the embodiments described below, and other embodiments, additions, modifications, deletions, and the like can be made within the scope that can be conceived by those skilled in the art.

A fixing device according to an embodiment of the present disclosure includes: a fixing member that is rotatable and fixes an unfixed image on a recording medium; a pressure member that presses an outer circumferential surface of the fixing member; and a heating source that is disposed inside an inner circumferential surface of the fixing member and heats the fixing member; and a composite member disposed inside the inner circumferential surface of the fixing member. The composite member includes: a first member; a second member attached to the first member, the first member and the second member having a difference in glossiness; and an inspection region that is a region for measuring glossiness is present on the composite member. It is identified which one of the first member and the second member is present on a surface of the inspection region based on the glossiness of the inspection region, and it is identified that the fixing device has a desired fixing configuration based on an identification result.

An image forming apparatus according to an embodiment of the present disclosure includes the fixing device according to an embodiment of the present disclosure.

An inspection method according to an embodiment of the present disclosure is provided for a fixing device including: a fixing member that is rotatable and fixes an unfixed image on a recording medium; a pressure member that presses an outer circumferential surface of the fixing member; a heating source that is disposed inside an inner circumferential surface of the fixing member and heats the fixing member, and a composite member disposed inside the inner circumferential surface of the fixing member, the composite member including a first member and a second member attached to the first member, the first member and the second member having a difference in glossiness. The inspection method includes: identifying which one of the first member and the second member is present on a surface of an inspection region that is a region for measurement of glossiness in the composite member, based on the glossiness of the inspection region; and determining that the fixing device has a desired fixing configuration based on an identification result.

According to an embodiment of the present disclosure, an inspection method for a composite member is provided. An inspection method for a composite member according to an embodiment of the present disclosure is an inspection method for a composite member included in a fixing device, the fixing device including: a fixing member that is rotatable and fixes an unfixed image on a recording medium, a pressure member that presses an outer circumferential surface of the fixing member; a heating source that is disposed inside an inner circumferential surface of the fixing member and heats the fixing member; and the composite member including a first member and a second member attached to the first member, the first member and the second member having a difference in glossiness. The inspection method includes: identifying which one of the first member and the second member is present on a surface of an inspection region that is a region for measurement of glossiness in the composite member, based on the glossiness of the inspection region; and identifying that the composite member has a desired configuration based on an identification result.

The fixing device and the image forming apparatus according to the embodiments of the present disclosure can inspect a component such as a thin and highly smooth reflector used in the fixing device at low cost. Therefore, it is possible to perform inspection for an error in assembling components, misalignment, and the like at low cost.

In addition, in the inspection method according to an embodiment of the present disclosure, since it is sufficient to merely detect a glossiness difference between components, it is possible to determine whether a component such as a thin and highly smooth reflector is disposed in a desired fixing device or image forming apparatus at low cost. For example, an opening for screwing or an opening for positioning on the non-functional surface of a reflector may be expanded to detect a difference in glossiness between components, which prevents cost increase.

FIG. 1 is a schematic view of a configuration of the image forming apparatus according to an embodiment of the present disclosure.

In the following description, the "image forming apparatus" includes a printer, a copier, a facsimile machine, or a multifunction peripheral having at least two of printing, copying, scanning, and facsimile functions. The term "image formation" in the following description means not only forming an image having a meaning such as texts and graphics but also forming an image having no meaning such as patterns.

Initially, referring to FIG. 1, a description will be given as to a general arrangement and operation of the image forming apparatus according to the present embodiment. As illustrated, the image forming apparatus 100 according to the present embodiment includes an image forming unit 200, a fixing unit 300, a recording medium feeding unit 400, and a recording medium ejection unit 500. The image forming unit 200 forms an image on a sheet-like recording medium such as a paper sheet. The fixing unit 300 fixes the image on the recording medium. The recording medium feeding unit 400 feeds the recording medium to the image forming unit 200. The recording medium ejection unit 500 ejects the recording medium to the outside of the apparatus.

The image forming unit 200 is provided with four process units 1Y, 1M, 1C, and 1Bk as image formation units, an exposure device 6, and a transfer device 8. The exposure device 6 forms an electrostatic latent image on a photoconductor 2 included in each of the process units 1Y, 1M, 1C, and 1Bk. The transfer device 8 transfers an image to a recording medium.

The process units 1Y, 1M, 1C, and 1Bk have the same configuration except for containing toner (developers) of different colors, i.e., yellow (Y), magenta (M), cyan (C), and black (Bk), respectively, corresponding to decomposed color separation components of full-color images. In describing the process units 1Y, 1M, 1C, and 1Bk without distinction, the process units 1Y, 1M, 1C, and 1Bk may be also referred to as a process unit 1.

Each process unit 1 includes a photoconductor 2, a charging member 3, a developing device 4, and a cleaning member 5.

The photoconductor 2 is an example of an image bearer, and bears an image on a surface thereof. The photoconductor 2 may be referred to as an electrostatic latent image bearer or the like. The photoconductor 2 has a drum-like shape, for example.

The charging member 3 electrically charges the surface of the photoconductor 2.

The developing device 4 supplies the toner as the developer to the surface of the photoconductor 2 to form a toner image. The toner image formed on the photoconductor 2 may be referred to as a visible image, a toner image, or the like.

The cleaning member 5 cleans the surface of the photoconductor 2.

The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside the loop of the intermediate transfer belt 11. Each primary transfer roller 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

The fixing unit 300 is provided with a fixing device 20 that heats the recording medium to which the image has been transferred and performs fixing. The fixing device 20 includes a fixing belt 106, a pressure roller 107, and the like.

The fixing belt 106 is an example of a fixing member, and is an endless belt having flexibility and being rotatable. The fixing belt 106 heats an image on a recording medium.

The pressure roller 107 is an example of a pressure member, and contacts the fixing belt 106 to form a nip portion (which may be referred to as a fixing nip or the like).

When the recording medium passes through the nip portion, the image is fixed to the recording medium.

The recording medium feeding unit 400 is provided with a sheet feeding cassette 14 and a sheet feeding roller 15. The sheet feeding cassette 14 stores a paper sheet P as a recording medium. The sheet feeding roller 15 feeds the paper sheet P from the sheet feeding cassette 14.

Hereinafter, the recording medium will be described as paper, but the recording medium is not limited to paper (paper sheet). Examples of the recording medium include not only a paper sheet but also an overhead projector (OHP) transparency sheet, a fabric, a metallic sheet, a plastic film, and a prepreg sheet including carbon fibers previously impregnated with resin. Examples of the paper sheet include thick paper, a postcard, an envelope, thin paper, coated paper (e.g., coated paper and art paper), and tracing paper, in addition to plain paper.

The recording medium ejection unit 500 is provided with a pair of sheet ejection rollers 17 and a sheet ejection tray 18. The pair of sheet ejection rollers 17 ejects the paper sheet P to the outside of the image forming apparatus. The paper sheet P ejected by the sheet ejection rollers 17 is placed on the sheet ejection tray 18.

Next, an example of a printing operation of the image forming apparatus 100 will be described.

When the printing operation is started in the image forming apparatus 100, the photoconductors 2 of the process units 1 and the intermediate transfer belt 11 of the transfer device 8 start to rotate. The feed roller 15 starts rotating to feed the paper sheet P from the sheet feeding cassette 14. The fed paper sheet P is brought into contact with a timing roller pair 16 and temporarily stopped until the image to be transferred to the paper sheet P is formed.

In each process unit 1, first, the surface of the photoconductor 2 is electrically charged to a uniform high potential by the charging member 3. According to image data of a document read by a document reading device or print data specified to print by a terminal, the exposure device 6 exposes the charged surfaces of the photoconductors 2. Accordingly, the electric potential at an exposed portion on the surface of each photoconductor 2 is decreased. Thus, an electrostatic latent image is formed on the surface of each photoconductor 2.

The developing device 4 supplies toner to the electrostatic latent image formed on the photoconductor 2, thereby forming a toner image thereon. The toner images formed on the photoconductors 2 reach the primary transfer nips (the positions of the primary transfer rollers 12) with the rotation of the photoconductors 2, and are transferred in sequence onto the rotating intermediate transfer belt 11 such that the toner images are superimposed on the intermediate transfer belt 11. Thus, a full-color toner image is formed on the intermediate transfer belt 11.

A single-color image may be formed using any one of the process units 1, or images of two or three colors may be formed using any two or three of the process units 1.

After the toner image is transferred to the intermediate transfer belt 11, the cleaning member 5 removes residual toner from the surfaces of the photoconductors 2.

Along with rotation of the intermediate transfer belt 11, the toner image transferred onto the intermediate transfer belt 11 is conveyed to the secondary transfer nip (the position of the secondary transfer roller 13) and is transferred onto the paper sheet P conveyed by the timing roller pair 16.

The paper sheet P is conveyed to the fixing device 20. The toner image on the paper sheet P is heated and pressed by the fixing belt 106 and the pressure rollers 107, and is fixed to the paper sheet P. Then, the paper sheet P is conveyed to the recording medium ejection unit 500, and is ejected by the sheet ejection rollers 17 onto the sheet ejection tray 18. Thus, a series of printing operations is completed.

Figure 2:
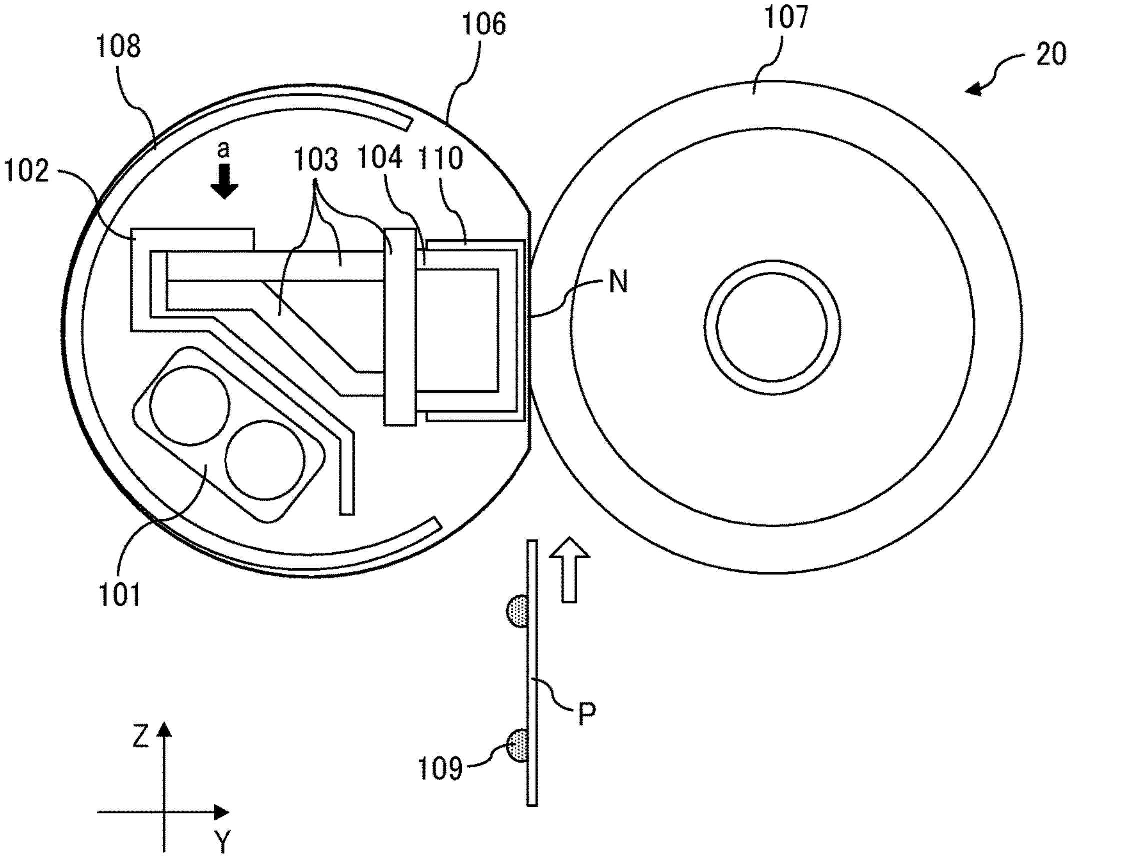
FIG. 2 is a schematic view of a fixing device according to an embodiment of the present disclosure.

FIG. 2 is a schematic view of an example of the fixing device 20 of the present embodiment.

The fixing device 20 of the present embodiment includes a heater 101, a reflector 102, a stay 103, a nip former 104, a fixing belt 106, a pressure roller 107, a belt supporting member 108, and a sliding sheet 110, for example.

The fixing belt 106 is an example of a fixing member, and is an endless belt having flexibility and being rotatable. The endless belt may be referred to as a sleeve-shaped belt. The fixing belt 106 is supported by the belt supporting member 108 and is rotatable. The direction of the rotation axis of the fixing belt 106 is a direction perpendicular to the paper surface, and is also referred to as a rotation axis direction, an axial direction, or the like. The fixing belt 106 is heated by radiant heat of the heater 101 as a heating source disposed inside (in the loop).

The fixing belt 106 includes a base material on the inner peripheral side formed of a metal material such as nickel or SUS or a resin material such as polyimide, and a release layer on the outer peripheral side formed of tetrafluoroethylene-perfluoroalkyl vinyl ether copolymer (PFA), polytetrafluoroethylene (PTFE), or the like, for example. An elastic layer formed of a rubber material such as silicone rubber, foamable silicone rubber, or fluororubber may be interposed between the base material and the release layer. While the fixing belt 21 and the pressure roller 22 pressingly sandwich the unfixed toner image on the paper sheet P to fix the toner image on the paper sheet P, the elastic layer having a thickness of about 100 um elastically deforms to absorb slight surface asperities of the fixing belt 21, preventing variation in gloss of the toner image on the paper sheet P.

The fixing belt 106 is preferably set to have a thickness of 1 mm or less as a whole and a diameter of 20 to 40 mm, and in this case, a low heat capacity can be achieved. The thicknesses of the base material, the elastic layer, and the release layer constituting the fixing belt 106 can be changed as appropriate, but the thicknesses of the base material, the elastic layer, and the release layer are preferably set to 20 to 50 μm, 100 to 300 μm, or 10 to 50 μm, for example. In order to further reduce the heat capacity, the thickness of the entire fixing belt 106 is desirably 0.2 mm or less, more desirably 0.16 mm or less, and the diameter is desirably 30 mm or less.

The belt supporting member 108 supports the fixing belt 106 at both ends of the fixing belt 106, for example. The belt supporting member 108 may be referred to as a belt holding member or the like. As the belt supporting member 108, a side plate flange can be used, for example.

The pressure roller 107 is an example of a pressure member, and is in contact with the outer circumferential surface of the fixing belt 106. The pressure roller 107 is disposed to face the nip former 104 with the fixing belt 106 interposed therebetween, and forms a nip portion N with the fixing belt 106. The pressure roller 107 can include a cored bar, an elastic layer made of foamable silicone rubber, fluorine rubber, or the like disposed on the surface of the cored bar, and a release layer made of PFA, PTFE, or the like disposed on the surface of the elastic layer, for example. For example, the pressure roller 107 is pressed against the fixing belt 106 by the spring of the pressure unit, and the elastic layer of the pressure roller 107 is crushed at a portion that is pressed against the fixing belt 106, whereby the nip portion N having a predetermined width is formed. The nip portion N may be referred to as a fixing nip N or the like.

The pressure roller 107 is rotationally driven by a drive source such as a motor disposed in the main body of the image forming apparatus, for example. When the pressure roller 107 is rotationally driven, the driving force is transmitted to the fixing belt 106 at the nip portion N, and the fixing belt 106 is driven to rotate. The fixing belt 106 is sandwiched in the fixing nip N and rotates, and is guided by side plate flanges disposed at both ends except for the nip portion N and travels.

In the present embodiment, the pressure roller 107 is a solid roller, but may be a hollow roller. In this case, a heat source such as a halogen heater may be disposed inside the pressure roller 107. The elastic layer of the pressure roller 107 may be made of solid rubber. Alternatively, if no heater is situated inside the pressure roller 107, the elastic layer of the pressure roller 107 may be made of sponge rubber. The sponge rubber is more desired because the sponge rubber is higher in thermal insulation so that the heat of the fixing belt 106 is less prone to be drawn.

The nip former 104 contacts the pressure roller 107 with the fixing belt 106 in between to form the nip portion N. As the nip former 104, a resin pad can be used, for example.

The stay 103 is an example of a support that supports the nip former 104.

The sliding sheet 110 is supported in contact with the nip former 104. The sliding sheet 110 in the present example is disposed closer to the pressure roller 107 than the nip former 104, but embodiments of the present disclosure are not limited to this configuration. For example, the sliding sheet 110 may be wound around the nip former 104.

The heater 101 is an example of a heating source, is disposed inside the fixing belt 106, and heats the fixing belt 106. The heater 101 heats the fixing belt 106 by radiant heat, for example. As the heating source, a halogen heater can be used, for example, and in addition, an induction heating device, a resistance heating element, a carbon heater, or the like may be used. As illustrated in the drawing, a plurality of heating sources may be provided.

When the paper sheet P passes through the nip portion N, the unfixed image 109 on the paper sheet P is fixed to the paper sheet P. A white arrow in the drawing schematically indicates the conveyance direction of the paper sheet P.

The reflector 102 is an example of a reflector, and reflects heat of the heater 101 (heating source), for example, radiant heat. The reflector 102 is disposed in contact with the stay 103. Using the reflector 102 increases the heating efficiency of the heater 101 with respect to the fixing belt 106. The reflector 102 is a metal component, for example, and is a thin, highly smooth, highly reflective, and highly glossy component, for example.

Further, using the reflector 102 suppresses energy consumption due to heating of the stay 103 by heat from the heater 101. This also leads to improvement of energy saving and shortening of recovery time. The reflector 102 preferably has a high reflectance, for example, a reflectance of 90% or more.

Figure 3:
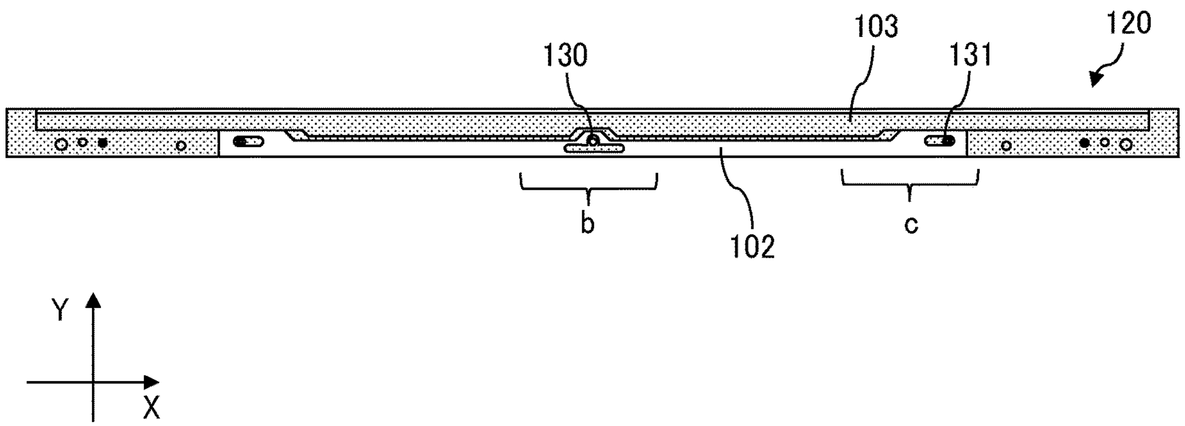
FIG. 3 is a schematic view of a reflector and a support according to an embodiment of the present disclosure.

FIG. 3 is a schematic plan view of an example of the composite member. FIG. 3 can also be said to be equivalent to a schematic view of the reflector 102 and the stay 103 in FIG. 2 when seen from a direction a in the drawing. To be precise, FIG. 3 illustrates a state before the composite member is incorporated inside the inner circumferential surface of the fixing belt 106. The reflector 102 is secured to the stay 103 by a screw 130 (securing member), for example. The stay 103 has a protrusion 131 for positioning. Details of FIG. 3 will be described later.

In the present embodiment, a portion having the stay 103 and the reflector 102 is referred to as a composite member, for example. In FIG. 3, the composite member is denoted by reference numeral 120. The composite member 120 is disposed inside the inner circumferential surface of the fixing belt 106. That is, the second member (for example, the reflector 102) is attached to the first member (the stay 103), and the composite member including the first member and the second member is disposed inside the inner circumferential surface of the fixing member.

Figure 4A:
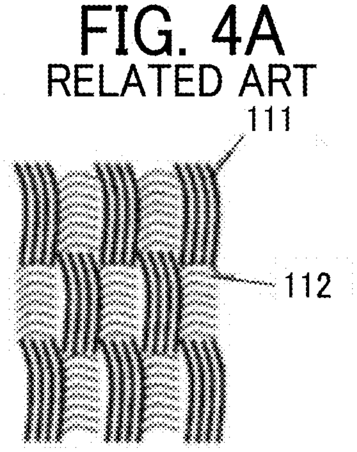
FIG. 4A RELATED ART
FIGS. 4A, 4B, and 4C are schematic views illustrating an inspection method according to a comparative example.
Figure 4B:
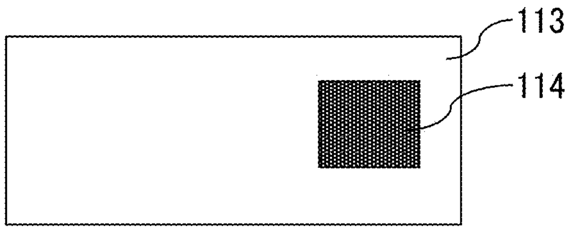
FIG. 4B RELATED ART
Figure 4C:
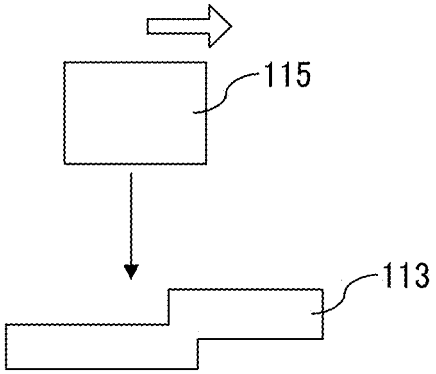
FIG. 4C RELATED ART

Conventionally, as methods for identifying components used in a fixing device, for example, composite members and reflectors, methods illustrated in FIGS. 4A to 4C are used, for example.

FIG. 4A illustrates an identification method by which to change the colors of a component. For example, for a component including a plurality of fibers 111 and 112 such as a sliding sheet, there has been proposed an identification method by which to change the colors of the fibers 111 and 112. In the case of using such a method, it is relatively easy to identify the component without affecting the function. This method can also be used for a component to which a harness is attached. However, the identification method by which to change the colors of a component is difficult to use for the reflector 102.

For example, Japanese Unexamined Patent Application Publication No. 2021-092639 of the related art proposes changing the colors of a component in order to identify the component, which makes it possible to effectively identify the component that can be changed in color without affecting the function. However, in the case of a sheet metal or the like, it is difficult to change the color without affecting the function.

FIG. 4B illustrates an identification method by which to attach a marking 114 to a component 113. Instead of the marking 114, an engraved mark or the like may be used. If the component 113 has the marking 114, the component 113 is identified as a proper component 113. However, in the case of using the marking 114 on a highly smooth component such as the reflector 102, there is a concern that the marking 114 may be scraped and disappear. Although there is no concern that the engraved mark disappears, it is difficult to avoid the risk of mis-assembly in the case of visual inspection.

FIG. 4C is an example of an identification method by jig inspection. For example, a stepped portion or an engraved mark is formed on the component 113, and the height is detected by a laser displacement sensor 115. A white arrow in the drawing indicates the moving direction of the sensor, and a black arrow in the drawing indicates a laser emitted from the sensor. However, this method has a disadvantage that, when the component is a thin sheet metal, it is difficult to detect the stepped portion or the engraved mark, and a jig (for example, a sensor) for improving accuracy is expensive.

Since the reflector 102 is thin and is highly smooth, it is difficult to apply the conventional identification methods as illustrated in FIGS. 4B and 4C to the reflector 102. On the other hand, in the present embodiment, it is possible to identify the reflector 102 while suppressing the cost as much as possible.

In the present embodiment, the following measure is taken.

In the fixing device of the present embodiment, a composite member having a first member (for example, the stay 103) and a second member (for example, the reflector 102) is disposed inside the inner circumferential surface of the fixing member, the second member is attached to the first member, and the first member and the second member have a difference in glossiness. In addition, the composite member has an inspection region that is a region for measuring glossiness, it is identified which one of the first member and the second member is present on the surface of the inspection region based on the glossiness of the inspection region, and it is identified that the fixing device has a desired fixing configuration based on the identification result.

The present embodiment aims to implement a means for identifying the composite member disposed in the fixing device or the image forming apparatus, in particular the second member (the reflector 102). Normally, since the reflector can be incorporated in both a first image forming apparatus and a second image forming apparatus, wrong assembly may occur. As described above, conventionally, the shape of the reflector is changed to prevent wrong assembly. On the other hand, in the present embodiment, in order to prevent an increase in the cost for preventing wrong assembly, the difference in glossiness between the first member and the second member is used to identify which one of the first member and the second member is present on the surface of the inspection region, thereby to identify whether wrong assembly has occurred. According to the present embodiment, it is possible to inspect a component such as a thin and highly smooth reflector at low cost.

In the case of being incorporated in the first image forming apparatus (for example, a low-speed image forming apparatus), a set of a reflector and a stay (composite member) having high glossiness is attached to a predetermined place (for example, an inspection region) in the composite member. On the other hand, in a case where the composite member is incorporated into the second image forming apparatus (for example, a high-speed image forming apparatus), a set of a reflector and a stay (composite member) having low glossiness is attached to a predetermined place in the composite member. In this way, it is possible to use the difference in glossiness between the first member and the second member to identify which one of the first member and the second member is present in the inspection region, thereby preventing wrong assembly.

This will be described in another expression. A composite member A incorporated in an image forming apparatus A includes a reflector A, and a composite member B incorporated in an image forming apparatus B includes a reflector B. For example, since the image forming apparatus A is a low-speed image forming apparatus (first image forming apparatus) and has an apparatus configuration with a small thermal load, the image forming apparatus A is designed to use the reflector A that is low in heat resistance performance but low in cost. In addition, since the image forming apparatus B is a high-speed image forming apparatus (second image forming apparatus) and has an apparatus configuration with a large thermal load, the image forming apparatus B is designed to use the reflector B that is high in heat resistance but high in cost. However, even if it is planned to incorporate the composite member A into the image forming apparatus A and incorporate the composite member B into the image forming apparatus B, there is a possibility that the composite member A is incorporated into the image forming apparatus B and the composite member B is incorporated into the image forming apparatus A due to a human error or the like.

Therefore, the inspection is performed using the difference in glossiness between the first member and the second member. Predetermined regions of the composite members A and B are set as inspection regions, and the inspection regions are measured in glossiness to identify which one of the first member and the second member is present on the surface of each inspection region. This makes it possible to identify that the fixing devices having the composite members each have a desired fixing configuration. The desired fixing configuration means that a component as designed is incorporated, for example, means that a reflector as designed is incorporated in the fixing device. The wrong reflector may cause a difference in the temperature of the fixing belt or the like, which leads to a difference in the temperature of the fixing nip, the temperature of the stay, or the like.

For example, in the composite member A included in the image forming apparatus A, no processing is performed on a portion corresponding to the inspection region of the reflector A such that the glossiness of the reflector A can be observed on the surface of the inspection region. On the other hand, in the composite member B included in the image forming apparatus B, an opening is disposed at a position corresponding to the inspection region of the reflector B such that the glossiness of the stay can be observed on the surface of the inspection region. By doing so, when the inspection region of the composite member A is observed, if the high glossiness of the reflector A is observed, it can be identified that the predetermined fixing configuration is formed, and if the high glossiness is not observed in the inspection region, it can be identified that the predetermined fixing configuration is not formed. On the other hand, when the inspection region of the composite member B is observed, if the low glossiness of the stay is observed, it can be identified that the predetermined fixing configuration is formed, and if the low glossiness is not observed in the inspection region, it can be identified that the predetermined fixing configuration is not formed. In this manner, which one of the first member and the second member is present on the surface of the inspection region is identified based on the glossiness of the inspection region, and it is identified that the fixing device has a desired fixing configuration based on the identification result.

The fixing device of the present embodiment is disposed in an image forming apparatus, and candidates of the image forming apparatus provided with the fixing device include a first image forming apparatus and a second image forming apparatus, for example. Examples of such image forming apparatuses include image forming apparatuses different in printing speed (also referred to as image forming speeds or the like). For example, the second image forming apparatus has a higher printing speed than the first image forming apparatus, and a difference in maximum printing speed between the first image forming apparatus and the second image forming apparatus is 5 sheets per minute or more. It is determined which one of the first member and the second member is present on the surface of the inspection region based on the glossiness of the inspection region in the composite member, and it is identified that the fixing device is disposed in the desired image forming apparatus based on the identification result. This makes it possible to identify whether the reflector is incorporated in the designed image forming apparatus.

The first member is a component used in the fixing device, and is preferably a support that supports a nip former. The second member is a component used in the fixing device, and is preferably a reflector (reflector) that is disposed inside the inner circumferential surface of the fixing member and reflects radiant heat radiated from a heating source. If the first member is a stay and the second member is a reflector, the glossiness is high and the inspection accuracy is improved. The second member is attached to the first member to form a composite member.

The surface of the reflector 102 that reflects radiant heat from the heater 101 will be referred to as a first surface, a functional surface, or the like. The surface of the reflector 102 that does not reflect radiant heat from the heater 101 will be referred to as a second surface, a non-functional surface, or the like. The non-functional surface (second surface) is used for securing to the stay 103, for example.

The reflector 102 used in the present embodiment has a function of reflecting radiant heat from the heater 101, and has a strong surface gloss. The same applies to the non-functional surface.

The reflector 102 is secured to the stay 103. The securing may be referred to as assembling. The stay 103 is made of a SUS plate, for example, and has lower glossiness than the reflector 102. The stay 103 has a cloudy gray color, for example.

Figure 5A:
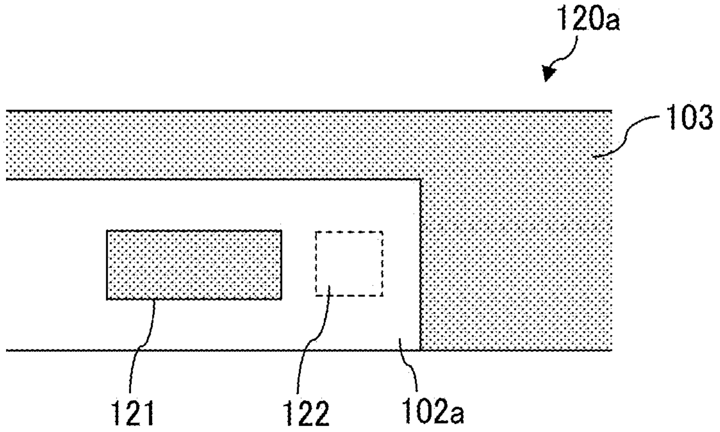
FIGS. 5A and 5B are diagrams illustrating an inspection region according to an embodiment of the present disclosure.
Figure 5B:
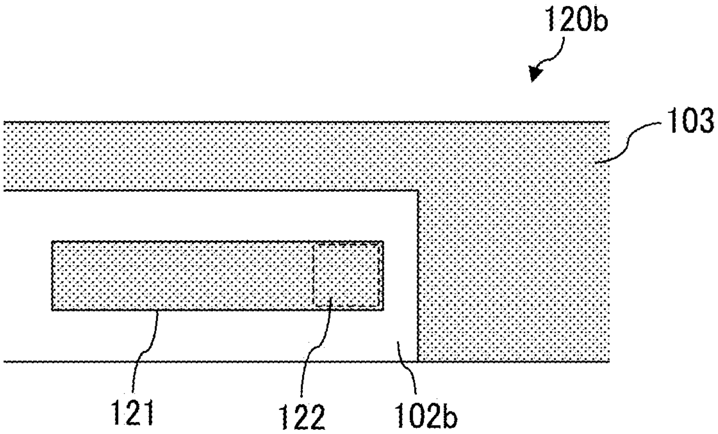

The present embodiment will be described with reference to FIGS. 5A and 5B. FIGS. 5A and 5B are schematic partial plan views of the reflector 102 secured to the stay 103. FIG. 5A is a schematic plan view of a main part of a composite member 120*a* that is assembled to a low-speed image forming apparatus. FIG. 5B is a schematic plan view of a main part of a composite member 120*b* that is assembled to a high-speed image forming apparatus. FIG. 5B corresponds to a portion b in FIG. 3.

As illustrated in FIGS. 5A and 5B, the composite member 120*a* and the composite member 120*b* use a common stay 103, but use different reflector 102*a* and reflector 102*b*.

In both FIGS. 5A and 5B, the composite member is provided with an inspection region 122 (that may be referred to as a region to be identified, a predetermined region, an arbitrary region, or the like.) for measuring glossiness. It is possible to identify which one of the stay 103 and the reflectors 102*a* and 102*b* is present on the surface in the inspection region 122 by using a difference in glossiness between the stay 103 and the reflectors 102*a* and 102*b*. It can be seen from a comparison between the inspection region 122 in FIG. 5A and the inspection region 122 in FIG. 5B that the glossiness difference in the inspection region 122 in FIG. 5A is larger because the area of the reflector is larger. On the other hand, in FIG. 5B, the glossiness difference in the inspection region 122 is small since the area of the reflector is small. Measuring the glossiness of the inspection region 122 makes it possible to identify whether the composite member is incorporated in the fixing device or the image forming apparatus as designed.

Arranging members different in glossiness in the inspection region 122 makes it possible to perform identification by appearance. For example, it is possible to accurately detect even a thin and highly smooth reflector by detecting the glossiness of the inspection region 122 using a jig (also referred to as measurement means or the like).

Referring to FIG. 5B, since the opening 121 is disposed in the reflector at the position corresponding to the inspection region, there is no concern that the marking disappears. In addition, since the inspection can be performed based on the glossiness of the inspection region, it is possible to prevent the necessity of an expensive jig. Therefore, it is possible to identify the reflector at as low cost as possible by detecting the glossiness of the component even if the reflector is a metal component that is characterized by thinness, high smoothness, and high reflectance.

A method for obtaining the glossiness of the inspection region 122 can be appropriately selected. For example, a method using an inspection jig (measurement means) may be used, or a visual recognition method may be used. Although not limited in particular, when the glossiness is determined as a numerical value using an inspection jig, for example, the determination of the glossiness will be also referred to as measurement of the glossiness. It is a matter of course that determining the glossiness includes measuring the glossiness, but it is also assumed that determining the glossiness by visual recognition is included. However, from the viewpoint of improving the accuracy, it is preferable to determine the glossiness by a numerical value, and it is preferable to measure the glossiness using an inspection jig or the like. In addition, measuring the glossiness may be referred to as detecting the glossiness.

In the above description, mainly discussed is identification of whether a component as designed is incorporated. In the present embodiment, it is also possible to determine whether the reflector 102 is attached at a desired position, for example. If the attachment position of the reflector 102 shifts from the desired position, the glossiness of the inspection region 122 changes. If the glossiness of the inspection region 122 is different from an assumed value, it can be determined that there is a misalignment. The glossiness of the inspection region 122 may be compared with a predetermined threshold value. The comparison with the thresholds is also described with reference to the flow described later.

In the present embodiment, it is preferable that the reflector 102 has the first surface irradiated with radiant heat from the heater 101 and the second surface used for securing to the first member, and the inspection region 122 is disposed on the second surface.

This reduces the influence on the function of the reflector. For example, in the composite member 120*b* incorporated in the second image forming apparatus (high-speed image forming apparatus), the opening of the reflector 102*b* in the inspection region 122 is enlarged. Forming the inspection region 122 on the second surface makes it possible to suppress the influence on the function of the second member even if the opening is disposed at the position corresponding to the inspection region in the second member.

The shape of the reflector 102 can be changed to cause a difference in glossiness from the stay 103 in the inspection region on any surface of the reflector 102, but it is preferable to change the shape of the reflector 102 on a surface that does not affect the reflection of radiant heat from the heater 101. In this case, the area and shape of a portion of the reflector 102 that reflects radiant heat from the heater 101 do not change, so that the reflection function of the reflector 102 can be prevented from being lowered. Therefore, it is possible to inspect the reflector 102 while minimizing the change in the configuration related to the fixing in the fixing device, and detect the erroneous assembling of the reflector 102.

The presence or absence of the opening of the second member in the inspection region, the size of the opening, and the like can be appropriately changed. Examples thereof will be described below.

In the present example, the second member has the first surface irradiated with radiant heat from a heating source and the second surface used for securing to the first member, and a securing member hole used for attaching to the first member is disposed on the second surface. The inspection region is disposed on the second surface. If the fixing device is disposed in the first image forming apparatus, the range to be identified is not located in the opening coupled to the securing member hole in the second member, and if the fixing device is disposed in the second image forming apparatus, the range to be identified is located in the opening coupled to the securing member hole in the second member.

In this case, the opening disposed at the position corresponding to the inspection region can be formed at the same time in the step of forming the securing member hole. This reduces the cost for producing the second member. In addition, if the opening is coupled to the securing member hole, the second member can be easily managed at the time of processing or inspection. Further, when the second member is secured to the first member, since the worker performs the work while visually checking the securing member hole, there is an advantage that the opening can also be visually checked. Therefore, it is possible to perform a visual check and a double check with the inspection jig (measurement unit), and it is possible to further prevent erroneous assembling.

An example in which the opening is coupled to the securing member hole will be described with reference to FIGS. 6A and 6B.

Figure 6A:
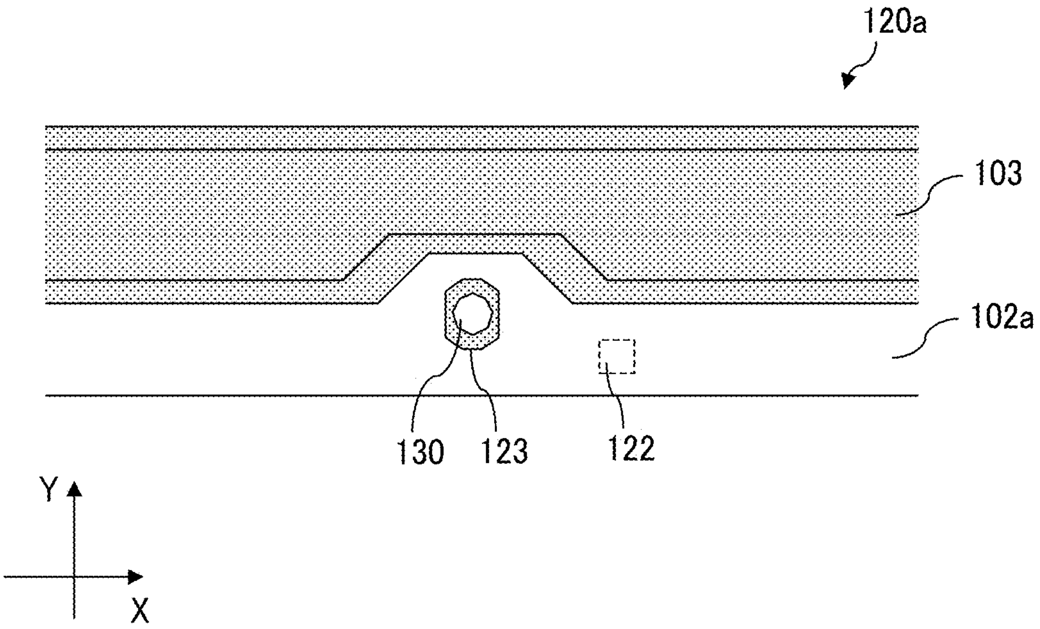
FIGS. 6A and 6B are diagrams illustrating an inspection region according to an embodiment of the present disclosure.
Figure 6B:
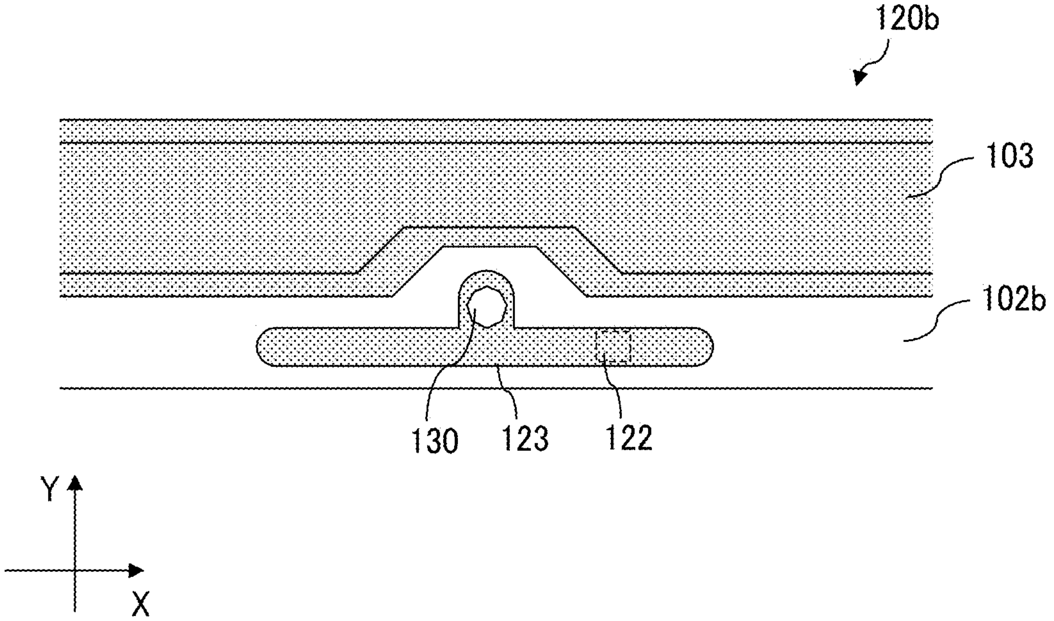

FIGS. 6A and 6B are schematic partial plan views of the reflector 102 secured to the stay 103. FIG. 6A is a schematic plan view of a main part of the composite member 120*a* that is assembled to a low-speed image forming apparatus. FIG. 6B is a schematic plan view of a main part of the composite member 120*b* that is assembled to a high-speed image forming apparatus. FIG. 6B corresponds to the portion b in FIG. 3.

As illustrated in FIGS. 6A and 6B, the composite member 120*a* and the composite member 120*b* use a common stay 103, but use different reflector 102*a* and reflector 102*b*.

In the examples illustrated in FIGS. 6A and 6B, the reflector 102 has the securing member hole 123, and the reflector 102 is secured to the stay 103 by the screw 130 (securing member). It can be seen from a comparison between the inspection region 122 in FIG. 6A and the inspection region 122 in FIG. 6B that the inspection region 122 in FIG. 6A has no opening of the reflector 102*a*, and thus the glossiness in the inspection region 122 in FIG. 6A is higher. On the other hand, in the example of FIG. 6B, the securing member hole 123 is extended to the inspection region 122, the stay 103 is exposed because there is the opening of the reflector 102*b* in the inspection region 122, and thus the glossiness in the inspection region 122 is lower. Measuring the glossiness of the inspection region 122 makes it possible to identify which one of the stay and the reflector is present on the surface of the inspection region, and it is possible to identify whether the composite member is incorporated in the fixing device or the image forming apparatus as designed based on the identification result.

As described above, the glossiness measured in the inspection region 122 is different between the examples in FIGS. 6A and 6B. By determining whether the glossiness measured in the inspection region 122 falls below a preset threshold, it can be determined whether the desired reflector 102 is attached or the attached reflector 102 has a desired fixing configuration.

Other examples of the presence or absence of the opening of the second member and the size of the opening in the inspection region will be described.

In the present example, the second member has the first surface irradiated with radiant heat from a heating source and the second surface used for securing to the first member, and a positioning hole used for attaching to the first member is disposed on the second surface. The inspection region is disposed on the second surface. If the fixing device is disposed in the first image forming apparatus, the range to be identified is not located in the opening coupled to the positioning hole in the second member, and if the fixing device is disposed in the second image forming apparatus, the range to be identified is located in the opening coupled to the positioning hole in the second member.

In this case, the opening disposed at the position corresponding to the inspection region can be formed at the same time in the step of forming the positioning hole. Accordingly, the cost for manufacturing the second member can be reduced. In addition, if the opening is coupled to the positioning hole, the second member can be easily managed at the time of processing or inspection. Further, when the second member is secured to the first member, since the worker performs the work while visually checking the positioning hole, there is an advantage that the opening can also be visually checked. Therefore, it is possible to perform a visual check and a double check with the inspection jig (measurement unit), and it is possible to further prevent erroneous assembling.

An example in which the opening is coupled to the positioning hole will be described with reference to FIGS. 7A and 7B.

Figure 7A:
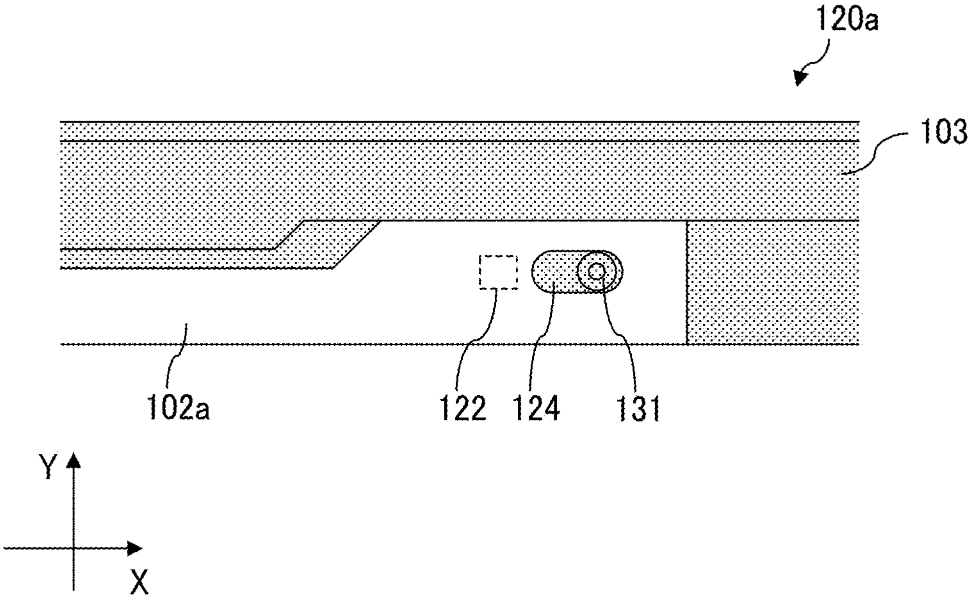
FIGS. 7A and 7B are diagrams illustrating an inspection region according to an embodiment of the present disclosure.
Figure 7B:
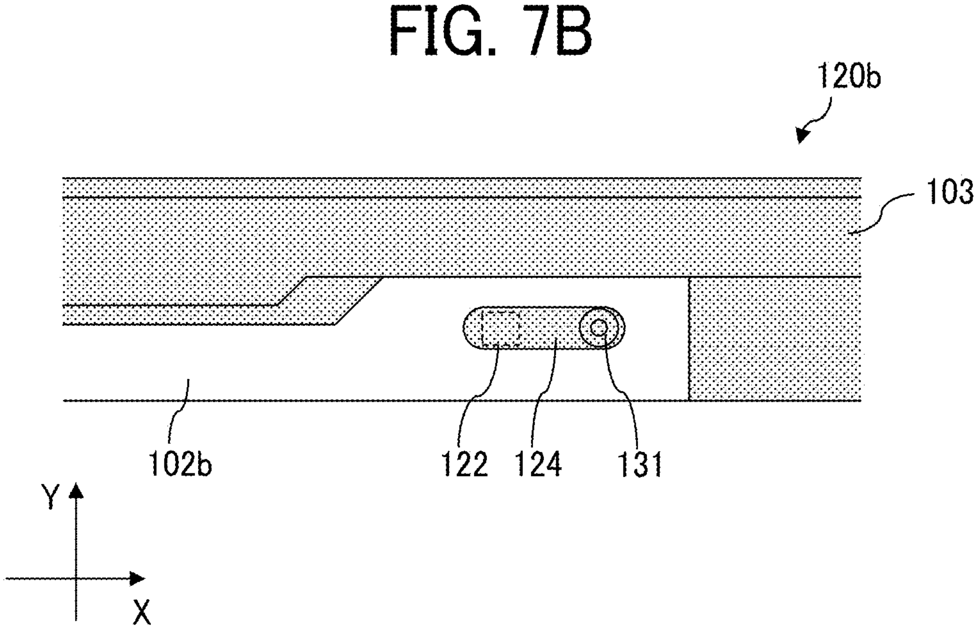

FIGS. 7A and 7B are schematic partial plan views of the reflector 102 secured to the stay 103. FIG. 7A is a schematic plan view of a main part of the composite member 120*a* that is assembled to a low-speed image forming apparatus. FIG. 7B is a schematic plan view of a main part of the composite member 120*b* that is assembled to a high-speed image forming apparatus. As illustrated in the drawings, the composite member 120*a* and the composite member 120*b* use a common stay 103, but use different reflector 102*a* and reflector 102*b*. FIG. 7B corresponds to the portion c in FIG. 3.

In the examples illustrated in FIGS. 7A and 7B, the reflector 102 has a positioning hole 124, and the stay 103 has a protrusion 131 for positioning. The reflector 102 is positioned by fitting the protrusion 131 into the positioning hole 124. It can be seen from a comparison between the inspection region 122 in FIG. 7A and the inspection region 122 in FIG. 7B that the inspection region 122 in FIG. 7A has no opening of the reflector 102*a*. Therefore, the glossiness of the reflector 102*a* is detected in the inspection region 122 in FIG. 7A, and the glossiness in the inspection region 122 is higher. On the other hand, in the example of FIG. 7B, the positioning hole 124 extends to the inspection region 122, and the stay 103 is exposed due to the opening of the reflector 102*b* in the inspection region 122. Therefore, the glossiness of the stay 103 is detected in the inspection region 122 in FIG. 7B, and the glossiness in the inspection region 122 is lower. Measuring the glossiness of the inspection region 122 makes it possible to identify which one of the stay and the reflector is present on the surface of the inspection region, and it is possible to identify whether the composite member is incorporated in the fixing device or the image forming apparatus as designed based on the identification result.

Next, as illustrated in FIGS. 5B, 6B, and 7B, the influence of providing an opening at a position corresponding to the inspection region 122 in the second member (for example, the reflector 102) will be described. In the following description, an example in which the second member is the reflector 102 will be described.

Providing the opening in the reflector 102 decreases the volume of the reflector 102 and reduces the amount of heat. When the heat capacity of the reflector 102 decreases, the rate of temperature rise of the reflector 102 increases even with the same amount of heat.

Accordingly, as time passes, the radiant heat of the heater 101 is easily absorbed by the fixing belt 106, and there is an advantage that the rate of temperature rise of the fixing belt 106 is increased. In addition, there is also an advantage that the temperature in the fixing belt 106 increases and the power consumption decreases as the temperature of the reflector 102 becomes higher at the time of continuous sheet passage.

On the other hand, providing the opening in the reflector 102 has an effect of increasing the maximum temperature of the reflector 102. In the case of an apparatus with high productivity, a longer temperature rise time and larger electric power are required, and thus the advantage of providing the opening is large, but there is a risk that the temperature exceeds the heat-resistant temperature due to the higher temperature of the reflector 102. In the case of an apparatus with low productivity, the reflector 102 is relatively unlikely to have a high temperature, and thus the risk in the case of providing the opening is lower than that in the case of an apparatus with high productivity.

Providing the opening in the reflector 102 has an effect that the discarded portion increases. As described above, providing the opening in the reflector 102 produces the effects such as an increase in the temperature of the reflector 102 and an increase in the discarded portion. Therefore, it is preferable to consider how to provide the opening in consideration of these effects.

In addition, it is preferable to optimize the opening of the reflector 102 by appropriately considering whether to enlarge the opening of the reflector 102 in an apparatus with high productivity or to enlarge the opening of the reflector 102 in an apparatus with low productivity. For example, if the fixing device of the present embodiment is used in a high-productivity image forming apparatus (for example, the above-described second image forming apparatus), the volume of the reflector 102 may be made larger to increase the heat capacity, or the volume of the reflector 102 may be made smaller to decrease the heat capacity. In addition, if the fixing device of the present embodiment is used in a low-productivity image forming apparatus (for example, the above-described first image forming apparatus), the volume of the reflector 102 may be made larger to increase the heat capacity, or the volume of the reflector 102 may be made smaller to decrease the heat capacity.

The high-productivity image forming apparatus is an apparatus whose image forming speed is equal to or higher than a predetermined speed, for example, and can also be said to be an apparatus with a large thermal load. On the other hand, the low-productivity image forming apparatus is an apparatus whose image forming speed is lower than a predetermined speed, for example, and can also be said to be an apparatus with a small thermal load.

The timing of measuring the glossiness of the inspection region in the composite member can be appropriately selected. In other words, the timing of performing the inspection method according to the embodiment of the present disclosure can be appropriately selected. For example, the timing may be a time point after the reflector is attached to the stay to form a composite member and before the reflector is disposed inside the inner circumferential surface of the fixing belt. In this case, since the composite member is exposed, the inspection can be easily performed. In addition, for example, the timing may be a time point after the reflector is attached to the stay to form a composite member and the composite member is disposed inside the inner circumferential surface of the fixing belt, and before the composite member is assembled to the image forming apparatus. In this case, it is necessary to visually recognize or measure the inspection region without being hindered by the fixing belt, but since the inspection can be performed in a later step of the apparatus manufacturing process, it is possible to avoid the repetition of the inspection that may be caused by a return to the former step. Besides, for example, the timing may be a time point after the image forming apparatus is manufactured. In this case, it is necessary to provide a configuration for visually recognizing or measuring the inspection region (for example, providing a window in the housing), but there is an advantage that the inspection can be performed even after the apparatus is manufactured.

Among the above, it is preferable to perform the inspection at a time point before manufacturing the fixing device. For example, a simple inspection device is prepared, and the inspection device includes a sensor jig secured therein. The composite member is set and inspected in the inspection device. In this way, the inspection device determines the glossiness in a predetermined place, and can determine the glossiness of the inspection region in the composite member. That is, the composite member can be positioned by the fixing device, and can be inspected at the same position every time.

In the present embodiment, even if the composite members are different, the inspection regions are at the same position. For example, the inspection regions of the composite member A and the composite member B are at the same position. Thus, it is also possible to compare and inspect the glossiness in the inspection region of the composite member A and the glossiness in the inspection region of the composite member B.

Figure 8:
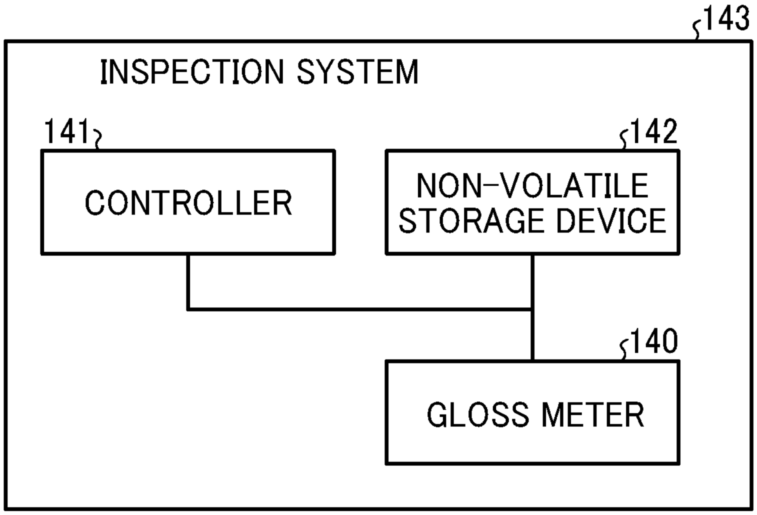
FIG. 8 is a schematic view of an inspection system according to an embodiment of the present disclosure.

FIG. 8 is a schematic view of an example of an inspection system that performs an inspection method according to an embodiment of the present disclosure. An inspection system 143 includes a controller 141, a non-volatile storage device 142, and a gloss meter 140. The controller 141 is used as an arithmetic device. The non-volatile storage device 142 stores programs, data, and the like in a non-volatile manner. The gloss meter 140 irradiates the object to be measured with light and measures the intensity of the reflected light. The controller 141 compares reflectance data transmitted from the gloss meter 140 with the data stored in the non-volatile storage device 142. From the comparison results, the controller 141 determines whether the object to be measured is the reflector 102 (for example, FIG. 5A) or the opening 121 (for example, FIG. 5B). The case where it is determined as the opening 121 corresponds to the case where it is determined that the stay 103 exists in the inspection region 122.

The configuration of the inspection system can be selected as appropriate. The inspection system of this example includes at least an inspection jig (which may be referred to as an inspection device or the like), and includes other devices as necessary. The inspection jig includes the gloss meter 140, and may include the controller 141, the non-volatile storage device 142, and the like as necessary. Another device may have the controller 141 and the non-volatile storage device 142.

Figure 9:
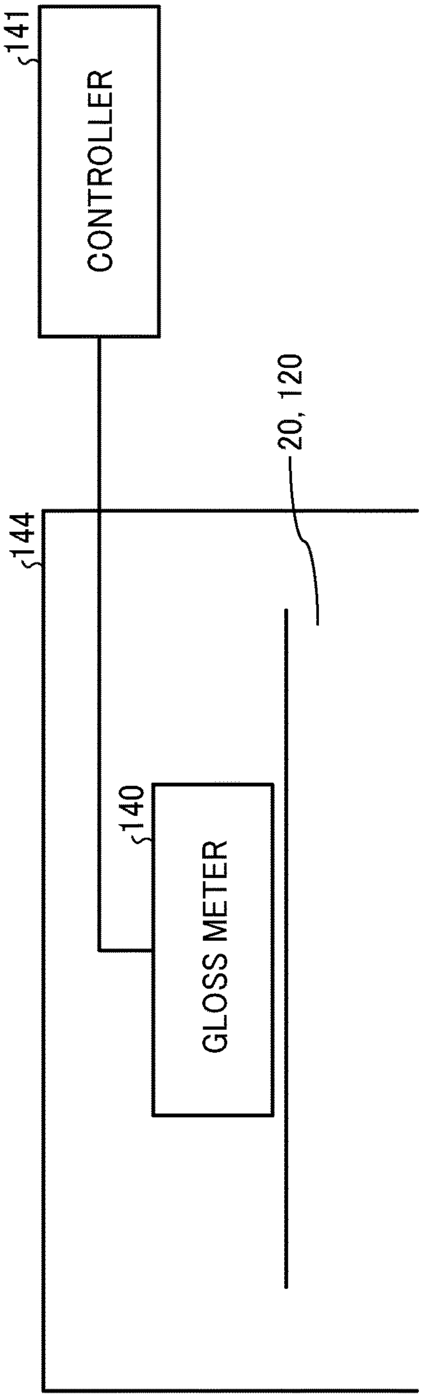
FIG. 9 is a schematic view illustrating glossiness measurement according to an embodiment of the present disclosure.

FIG. 9 is a schematic view of an example of glossiness measurement, and is a schematic view of a measurement example in the case of using an inspection jig.

The inspection jig includes the gloss meter 140. The gloss meter 140 preferably measures glossiness in a dark place. In this case, accuracy can be improved. For securing a dark place, a cover 144 is used, for example. The cover 144 may cover the entire object to be measured, or may cover a part of the object to be measured including the inspection region 122. The cover 144 is not limited in particular, and may be a cloth such as a black curtain, or a member of a box shape or the like.

In the drawing, the fixing device 20 and the composite member 120 are indicated by reference numerals as the objects to be measured. It is preferable to perform the measurement in a state where the inspection region 122 of the object to be measured is close to or in contact with the gloss meter 140.

The gloss meter 140 is coupled to the controller 141. The gloss meter 140 measures the glossiness of the inspection region 122 in response to an instruction from the controller 141. The controller 141 acquires the measurement value from the gloss meter 140.

Figure 10:
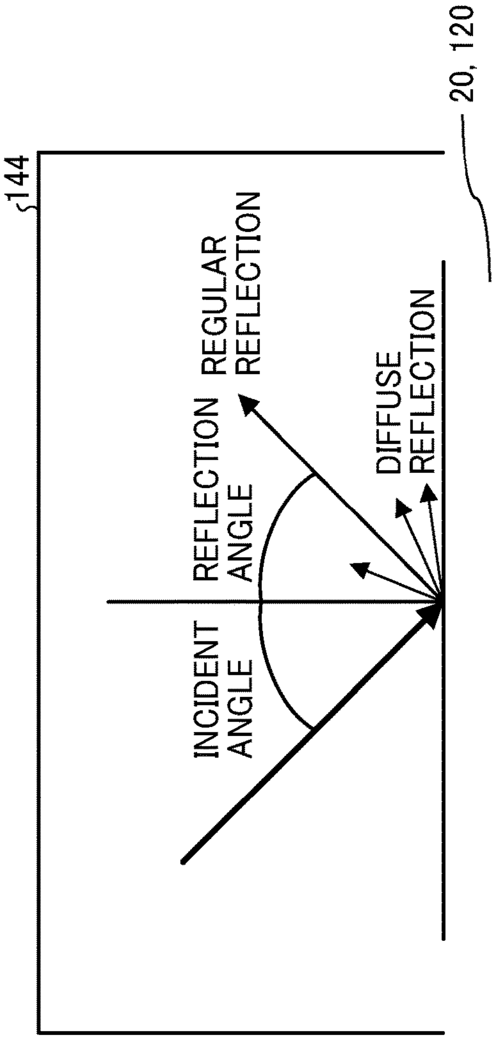
FIG. 10 is a schematic view for describing an example of light reflection in the glossiness measurement of FIG. 9.

FIG. 10 is a schematic view of an example of light reflection. The gloss meter 140 irradiates the object to be measured with light and measures the intensity of specular reflection light. The ratio between the intensity of the emitted light and the intensity of the specular reflection light is quantified as an index of gloss, and the obtained value is defined as glossiness. The gloss meter 140 may transmit the glossiness to the controller 141 or may transmit the intensity of light to the controller 141.

Figure 11:
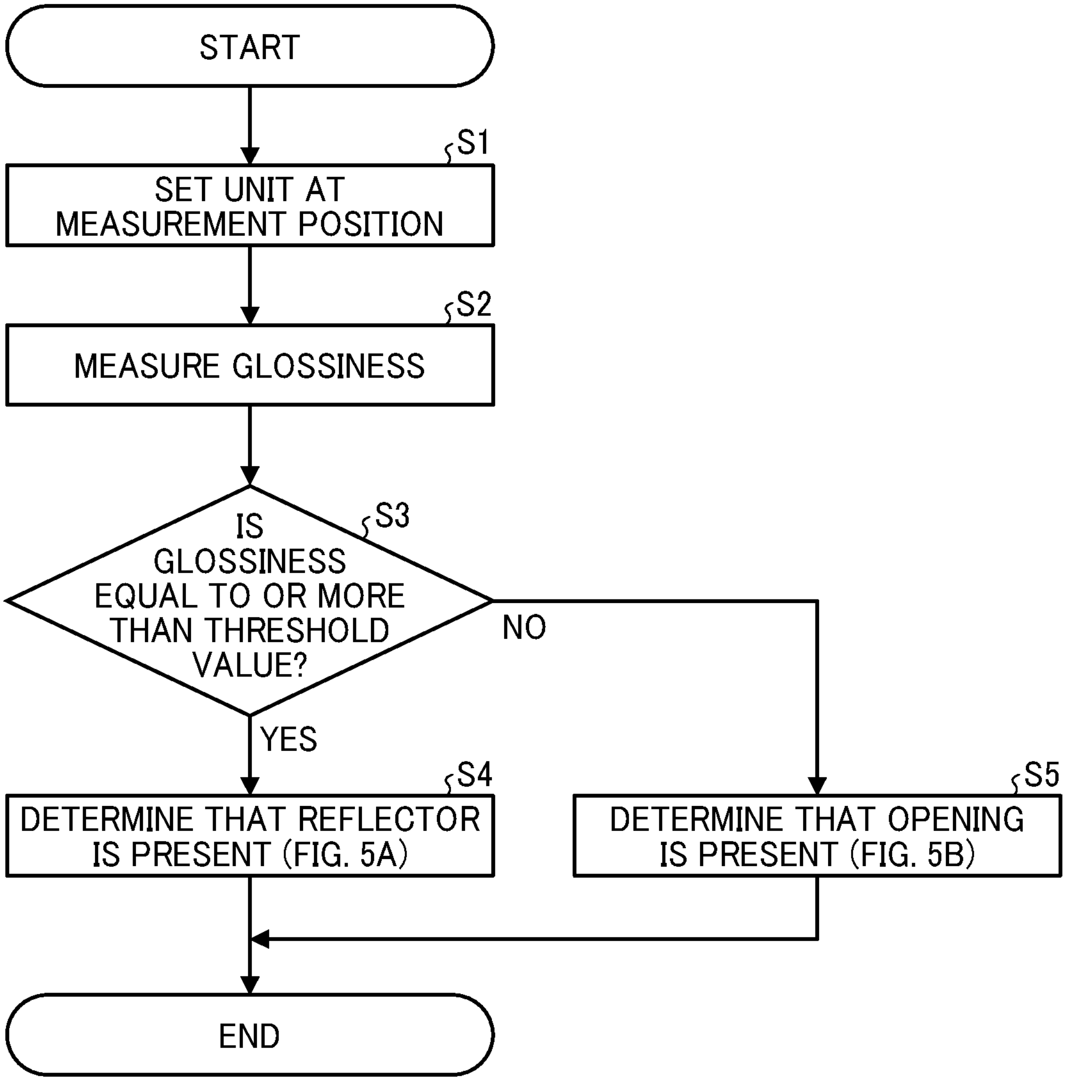
FIG. 11 is a flowchart of a determination according to an embodiment of the present disclosure.

FIG. 11 is a flowchart illustrating an example of the determination.

In S1, a unit (object to be measured) is set at the measurement position.

In S2, the glossiness of the unit is measured. The glossiness is measured by the method described above.

In S3, it is determined whether the measured glossiness is equal to or greater than a threshold value. The threshold value is stored in the non-volatile storage device 142, for example, and it is possible to determine whether the measured value is equal to or greater than the threshold value by comparing the measured value with the value stored in the non-volatile storage device 142.

S4 is a step that is performed if the determination result of S3 is YES. In S4, it is determined that the reflector 102 is present in the inspection region 122.

S5 is a step that is performed if the determination result of S3 is NO. In S5, it is determined that the opening 121 is present in the inspection region 122. That is, it is determined that the stay 103 is present in the inspection region 122.

Through this inspection, it is possible to identify which one of the reflector 102 and the stay 103 is present in the inspection region 122, and it is possible to identify that the object to be measured has a desired configuration based on the identification result.

The identification result may be displayed on an arbitrary display unit. In addition, the identification result may be displayed on a use terminal of a user (including an inspector). The display content of the identification result is not limited in particular, and which one of the reflector 102 and the stay 103 is present in the inspection region 122 may be displayed, or Good or Not Good may be displayed as the inspection result, for example. The glossiness may be displayed.

S1 will be additionally described.

A mode in which the unit (object to be measured) is set at the measurement position can be selected as appropriate. For example, the object to be measured may be set at the measurement position of the inspection jig. In this case, for example, one or a plurality of positioning protrusions is disposed in the inspection jig, and the object to be measured is set in the inspection jig so as to be secured to the protrusions. In this way, the inspection region 122 can be secured at a predetermined position, and the object to be measured can be measured in the inspection region 122 at the same position every time. At this time, securing the arrangement of the gloss meter 140 makes it possible to measure the glossiness of the object to be measured in the inspection region 122 at the same position. In this case, in measuring another object to be measured, the inspection region 122 can be set at the same position between the objects to be measured.

The mode in which the unit (object to be measured) is set at the measurement position can also be selected as appropriate in other than the above cases. In addition to the above cases, an inspection jig may be set on the object to be measured, for example. Deciding a predetermined position where the inspection jig is to be set on the object to be measured makes it possible to measure the object to be measured in the inspection region 122 at the same position every time. In this case, in measuring another object to be measured, the inspection region 122 can be set at the same position between the objects to be measured.

The inspection jig includes at least the gloss meter 140, and includes other members and the like as appropriate. For example, the inspection jig may have a placement table (other names can also be selected as appropriate) for setting the object to be measured. Besides, the inspection jig may have the cover 144. If the inspection jig includes the placement table and the cover 144, it is easy to measure the object to be measured.

The inspection of the fixing device can also be performed in a state where the fixing belt 106 and the like are disposed. For example, the inspection region 122 is set at a portion where the inspection can be performed even in a state where the fixing belt 106 and the like are disposed. For example, the inspection region 122 may be set in the portion c of FIG. 3, and the portion c of FIG. 3 may be located outside of the fixing belt 106 in the direction of rotation axis of the fixing belt 106.

As described above, the inspection method of the present embodiment includes, for example, the glossiness measurement step of measuring the glossiness of the inspection region, the glossiness measurement step is performed using the inspection jig, and the inspection jig determines the glossiness based on the difference in intensity between the light incident on the inspection region and the reflected light. The inspection accuracy can be improved by using the inspection jig.

The embodiment of the present disclosure will be supplementarily described.

The inspection region 122 may be a region disposed at a position where it is possible to identify whether the first member and the second member are assembled as designed based on the difference in the measured glossiness. It is possible to determine whether the inspection region 122 is present on in the composite member 120 by comparing a plurality of composite members 120, for example. For example, it is possible to determine whether the inspection region 122 is present on the composite member 120 by comparing the composite member 120*a* and the composite member 120*b* and checking for the difference in shape as illustrated in FIGS. 6A and 6B or 7A and 7B. Similarly, it is possible to determine whether the inspection region 122 is present on the fixing device 20 by comparing a plurality of fixing devices 20, for example.

Aspects of the present disclosure are as follows, for example.

First Aspect

According to a first aspect, a fixing device includes: a fixing member that is rotatable and fixes an unfixed image on a recording medium; a pressure member that presses an outer circumferential surface of the fixing member, and a heating source that is disposed inside an inner circumferential surface of the fixing member and heats the fixing member, in which a composite member including a first member and a second member is disposed inside the inner circumferential surface of the fixing member, the second member is attached to the first member, the first member and the second member have a difference in glossiness, an inspection region that is a region for measuring glossiness is present on the composite member, it is identified which one of the first member and the second member is present on a surface of the inspection region based on the glossiness of the inspection region, and it is identified that the fixing device has a desired fixing configuration based on an identification result.

Second Aspect

According to a second aspect, the fixing device of the first aspect is for use in an image forming apparatus whose candidates include a first image forming apparatus and a second image forming apparatus. The second image forming apparatus has a higher printing speed than the first image forming apparatus. A difference in maximum printing speed between the first image forming apparatus and the second image forming apparatus is five sheets per minute or more. It is identified which one of the first member and the second member is present on the surface of the inspection region based on the glossiness of the inspection region, and it is identified that the fixing device is included in a desired image forming apparatus based on an identification result.

Third Aspect

According to a third aspect, in the fixing device of the first aspect or the second aspect, the first member is a support that supports a nip former, the nip former abuts on the pressure member via the fixing member to form a nip portion, and the second member is a reflector that is disposed inside the inner circumferential surface of the fixing member and reflects radiant heat radiated from the heating source.

Fourth Aspect

According to a fourth aspect, in the fixing device of any of the first aspect to the third aspect, the second member has a first surface irradiated with radiant heat from the heating source and a second surface used for securing the second member to the first member, and the inspection region is disposed on the second surface.

Fifth Aspect

According to a fifth aspect, in the fixing device of the second aspect, the second member has a first surface irradiated with radiant heat from the heating source and a second surface used for securing the second member to the first member, the second surface has a securing member hole used for attaching the second member to the first member, and the inspection region is disposed on the second surface. When the fixing device is included in the first image forming apparatus, the inspection region is not located in an opening coupled to the securing member hole in the second member, and when the fixing device is included in the second image forming apparatus, the inspection region is located in the opening coupled to the securing member hole in the second member.

Sixth Aspect

According to a sixth aspect, in the fixing device of the second aspect, the second member has a first surface irradiated with radiant heat from the heating source and a second surface used for securing the second member to the first member, the second surface has a positioning hole used for attaching the second member to the first member, and the inspection region is disposed on the second surface. When the fixing device is included in the first image forming apparatus, the inspection region is not located in an opening coupled to the positioning hole in the second member, and when the fixing device is included in the second image forming apparatus, the inspection region is located in the opening coupled to the positioning member hole in the second member.

Seventh Aspect

According to a seventh aspect, an image forming apparatus includes the fixing device of any of the first aspect to the sixth aspect.

Eighth Aspect

According to an eighth aspect, an inspection method is provided for a fixing device that includes: a fixing member that is rotatable and fix an unfixed image on a recording medium, a pressure member that presses an outer circumferential surface of the fixing member; a heating source that is disposed inside an inner circumferential surface of the fixing member and heats the fixing member; a composite member disposed inside the inner circumferential surface of the fixing member, the composite member including a first member and a second member attached to the first member, the first member and the second member having a difference in glossiness. The inspection method includes: identifying which one of the first member and the second member is present on a surface of an inspection region that is a region for measurement of glossiness in the composite member, based on the glossiness of the inspection region; and determining that the fixing device has a desired fixing configuration based on an identification result.

Ninth Aspect

According to a ninth aspect, the inspection method of the eighth aspect includes measuring the glossiness of the inspection region, in which the measuring is performed using an inspection jig, and the inspection jig determines the glossiness based on a difference in intensity between light incident on the inspection region and reflected light.

Tenth Aspect

According to a tenth aspect, an inspection method is provided for a composite member included in a fixing device, the fixing device including: a fixing member that is rotatable and fixes an unfixed image on a recording medium; a pressure member that presses an outer circumferential surface of the fixing member; a heating source that is disposed inside an inner circumferential surface of the fixing member and heats the fixing member; and the composite member including a first member and a second member attached to the first member, the first member and the second member having a difference in glossiness. The inspection method includes: identifying which one of the first member and the second member is present on a surface of an inspection region that is a region for measurement of glossiness in the composite member, based on the glossiness of the inspection region; and identifying that the composite member has a desired configuration based on an identification result.

Eleventh Aspect

According to an eleventh aspect, the inspection method of the tenth aspect further includes measuring the glossiness of the inspection region, in which the measuring is performed using an inspection jig, and the inspection jig determines the glossiness based on a difference in intensity between light incident on the inspection region and reflected light.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A fixing device comprising:

a fixing rotator to fix an unfixed image on a recording medium;

a pressure member disposed opposite the fixing rotator to press an outer circumferential surface of the fixing rotator;

a heating source disposed inside an inner circumferential surface of the fixing rotator to heat the fixing rotator; and a composite member disposed inside the inner circumferential surface of the fixing rotator, the composite member including:

a first member;

a second member attached to the first member, the first member and the second member having a difference in glossiness;

circuitry configured to measure glossiness; and an inspection region at which the glossiness is measured by the circuitry configured to measure glossiness, the inspection region allowing identification of which one of the first member and the second member is present on a surface of the inspection region based on the glossiness of the inspection region, and determination that the fixing device has a predetermined fixing configuration based on a result of the identification, wherein:

the fixing device is for use in an image forming apparatus whose candidates include a first image forming apparatus and a second image forming apparatus, the second image forming apparatus has a higher printing speed than the first image forming apparatus, a difference in maximum printing speed between the first image forming apparatus and the second image forming apparatus is five sheets per minute or more, and the inspection region allows identification of which one of the first member and the second member is present on the surface of the inspection region based on the glossiness of the inspection region, and determination of whether the fixing device is included in a desired image forming apparatus based on a result of the identification, the second member has a first surface irradiated with radiant heat from the heating source and a second surface used for securing the second member to the first member, the second surface has a securing member hole used for attaching the second member to the first member, the inspection region is disposed on the second surface, when the fixing device is included in the first image forming apparatus, the inspection region is not located in an opening coupled to the securing member hole in the second member, and when the fixing device is included in the second image forming apparatus, the inspection region is located in the opening coupled to the securing member hole in the second member.

2. The fixing device according to claim 1, further comprising a nip former that abuts on the pressure member via the fixing rotator to form a nip portion, wherein the first member is a support supporting the nip former, and the second member is a reflector disposed inside the inner circumferential surface of the fixing rotator to reflect radiant heat radiated from the heating source.

3. An image forming apparatus comprising the fixing device according to claim 1.

4. A fixing device comprising:

a fixing rotator to fix an unfixed image on a recording medium;

a pressure member disposed opposite the fixing rotator to press an outer circumferential surface of the fixing rotator;

a heating source disposed inside an inner circumferential surface of the fixing rotator to heat the fixing rotator; and a composite member disposed inside the inner circumferential surface of the fixing rotator, the composite member including:

a first member;

a second member attached to the first member, the first member and the second member having a difference in glossiness;

circuitry configured to measure glossiness; and an inspection region at which the glossiness is measured by the circuitry configured to measure glossiness, the inspection region allowing identification of which one of the first member and the second member is present on a surface of the inspection region based on the glossiness of the inspection region, and determination that the fixing device has a predetermined fixing configuration based on a result of the identification, wherein:

the fixing device is for use in an image forming apparatus whose candidates include a first image forming apparatus and a second image forming apparatus, the second image forming apparatus has a higher printing speed than the first image forming apparatus, a difference in maximum printing speed between the first image forming apparatus and the second image forming apparatus is five sheets per minute or more, and the inspection region allows identification of which one of the first member and the second member is present on the surface of the inspection region based on the glossiness of the inspection region, and determination of whether the fixing device is included in a desired image forming apparatus based on a result of the identification, the second member has a first surface irradiated with radiant heat from the heating source and a second surface used for securing the second member to the first member, the second surface has a positioning hole used for attaching the second member to the first member, the inspection region is disposed on the second surface, when the fixing device is included in the first image forming apparatus, the inspection region is not located in an opening coupled to the positioning hole in the second member, and when the fixing device is included in the second image forming apparatus, the inspection region is located in the opening coupled to the positioning hole in the second member.

5. The fixing device according to claim 4, further comprising a nip former that abuts on the pressure member via the fixing rotator to form a nip portion, wherein the first member is a support supporting the nip former, and the second member is a reflector disposed inside the inner circumferential surface of the fixing rotator to reflect radiant heat radiated from the heating source.

6. An image forming apparatus comprising the fixing device according to claim 4.

7. An inspection method for a fixing device including a fixing rotator to fix an unfixed image on a recording medium; and a composite member disposed inside an inner circumferential surface of the fixing rotator, the composite member including a first member and a second member attached to the first member, the first member and the second member having a difference in glossiness, the inspection method comprising:

identifying which one of the first member and the second member is present on a surface of an inspection region that is a region for measurement of glossiness in the composite member, based on the glossiness of the inspection region; determining that the fixing device has a desired fixing configuration based on an identification result;

measuring the glossiness of the inspection region with an inspection jig; and determining the glossiness with the inspection jig based on a difference in intensity between light incident on the inspection region and reflected light from the inspection region.

* * * * *